US008997255B2

(12) United States Patent
Fusella et al.

(10) Patent No.: US 8,997,255 B2
(45) Date of Patent: Mar. 31, 2015

(54) VERIFYING DATA INTEGRITY IN A DATA STORAGE DEVICE

(75) Inventors: Yves Fusella, Aubagne (FR); Alexandre Croguennec, Aix en Provence (FR)

(73) Assignee: Inside Secure, Aix-en-Provence Cedex (FR)

(*) Notice: Subject to any disclaimer, the term of this patent is extended or adjusted under 35 U.S.C. 154(b) by 1171 days.

(21) Appl. No.: 11/516,846

(22) Filed: Sep. 7, 2006

(65) Prior Publication Data
US 2009/0327633 A1  Dec. 31, 2009

Related U.S. Application Data

(60) Provisional application No. 60/834,609, filed on Jul. 31, 2006.

(51) Int. Cl.
G06F 9/26 (2006.01)
G06F 21/64 (2013.01)
G06F 21/79 (2013.01)

(52) U.S. Cl.
CPC ............... *G06F 21/64* (2013.01); *G06F 21/79* (2013.01)
USPC ............................................. 726/30; 711/202

(58) Field of Classification Search
USPC ............ 365/185.33; 713/161–167; 726/4, 26, 726/30; 711/103, 108, 163
See application file for complete search history.

(56) References Cited

U.S. PATENT DOCUMENTS

| 4,049,956 A | 9/1977 | Van Veen |
| 4,360,915 A | 11/1982 | Sindelhar |
| 4,618,954 A | 10/1986 | Otobe et al. |
| 4,710,842 A | 12/1987 | Suzuki et al. |
| 4,811,294 A | 3/1989 | Kobayashi et al. |
| 4,910,707 A | 3/1990 | Schrenk |

(Continued)

FOREIGN PATENT DOCUMENTS

| DE | 42 05 352 | 9/1992 |
| EP | 0 874 369 A | 10/1998 |

(Continued)

OTHER PUBLICATIONS

PCT International Search Report and Written Opinion from PCT Application PCT/US2007/077715, mailed Mar. 11, 2008 (11 pages).

(Continued)

*Primary Examiner* — Matthew Smithers
*Assistant Examiner* — Phy Anh Vu
(74) *Attorney, Agent, or Firm* — Panitch Schwarze Belisario & Nadel LLP

(57) ABSTRACT

A data storage device may include one or more pages, each page having a fixed number of memory cells, each memory cell being adapted to store one unit of data; a verification page, the verification page having a corresponding fixed number of verification cells, each verification cell storing a predetermined value; and a controller configured to 1) receive a read command having an address value, and 2) upon receiving the read command, a) retrieve a predetermined value from a verification cell corresponding to the address value, b) determine whether the retrieved predetermined value is an expected value, and c) if so, providing a retrieved unit of data, and if not, initiating a protective action. Determining whether the retrieved predetermined value is the expected value may include applying a function to the address value to obtain a result and determining whether the result corresponds to the retrieved predetermined value.

23 Claims, 3 Drawing Sheets

(56) References Cited

U.S. PATENT DOCUMENTS

| | | | |
|---|---|---|---|
| 5,053,992 A | 10/1991 | Gilberg et al. | |
| 5,084,843 A | 1/1992 | Mitsuishi et al. | |
| 5,084,873 A | 1/1992 | Houston | |
| 5,107,139 A | 4/1992 | Houston | |
| 5,159,629 A | 10/1992 | Double et al. | |
| 5,361,227 A * | 11/1994 | Tanaka et al. | 365/185.22 |
| 5,428,569 A | 6/1995 | Kato et al. | |
| 5,469,141 A | 11/1995 | Ghazarian | |
| 5,533,123 A | 7/1996 | Force et al. | |
| 5,544,098 A | 8/1996 | Matsuo et al. | |
| 5,606,532 A | 2/1997 | Lambrache et al. | |
| 5,644,530 A * | 7/1997 | Gaultier | 365/185.09 |
| 5,684,460 A | 11/1997 | Scanlon | |
| 5,699,298 A * | 12/1997 | Shiau et al. | 365/185.18 |
| 5,708,414 A | 1/1998 | Peltier et al. | |
| 5,712,973 A | 1/1998 | Dayan et al. | |
| 5,736,777 A | 4/1998 | Shield et al. | |
| 5,796,148 A | 8/1998 | Gorman | |
| 5,898,711 A | 4/1999 | Buer | |
| 5,991,519 A | 11/1999 | Benhammou et al. | |
| 6,101,587 A * | 8/2000 | Kim | 711/163 |
| 6,157,035 A | 12/2000 | Kuijk et al. | |
| 6,204,701 B1 | 3/2001 | Tsay et al. | |
| 6,236,393 B1 | 5/2001 | Ogawa | |
| 6,249,456 B1 | 6/2001 | Chehadi | |
| 6,307,784 B1 * | 10/2001 | Hamilton et al. | 365/185.22 |
| 6,331,946 B1 | 12/2001 | Silverbrook et al. | |
| 6,346,835 B1 | 2/2002 | Ozeki et al. | |
| 6,366,481 B1 | 4/2002 | Balakrishnan et al. | |
| 6,377,086 B1 | 4/2002 | Bays et al. | |
| 6,414,318 B1 | 7/2002 | Uber et al. | |
| 6,553,496 B1 | 4/2003 | Buer | |
| 6,654,884 B2 | 11/2003 | Jaffe et al. | |
| 6,665,161 B1 | 12/2003 | Brady et al. | |
| 6,801,060 B2 | 10/2004 | Ikehashi et al. | |
| 6,834,331 B1 | 12/2004 | Liu | |
| 6,868,009 B1 | 3/2005 | Hung et al. | |
| 6,873,706 B1 | 3/2005 | Miyazaki et al. | |
| 6,969,859 B2 | 11/2005 | Klaasen et al. | |
| 6,970,385 B2 | 11/2005 | Sakakibara | |
| 6,998,670 B2 | 2/2006 | Lojek | |
| 7,068,063 B2 | 6/2006 | Seike | |
| 7,142,400 B1 | 11/2006 | Williams et al. | |
| 7,159,153 B2 | 1/2007 | Kim | |
| 7,193,430 B2 | 3/2007 | Ookawa | |
| 7,295,046 B2 | 11/2007 | Chan et al. | |
| 7,348,836 B1 | 3/2008 | Velmurugan | |
| 2002/0046373 A1 * | 4/2002 | Chou et al. | 714/718 |
| 2003/0216129 A1 | 11/2003 | Khalil et al. | |
| 2004/0078589 A1 | 4/2004 | Giraud | |
| 2004/0080999 A1 | 4/2004 | Madurawe | |
| 2004/0114427 A1 * | 6/2004 | Hamaguchi | 365/158 |
| 2004/0139340 A1 | 7/2004 | Johnson et al. | |
| 2004/0140892 A1 | 7/2004 | Hanood | |
| 2004/0237001 A1 | 11/2004 | Schulz et al. | |
| 2005/0029460 A1 | 2/2005 | Iwatschenko-Borho et al. | |
| 2005/0235179 A1 | 10/2005 | Pistoulet | |
| 2005/0236683 A1 | 10/2005 | Shapiro et al. | |
| 2005/0246600 A1 | 11/2005 | Pistoulet | |
| 2005/0259485 A1 * | 11/2005 | Kim | 365/200 |
| 2005/0283566 A1 | 12/2005 | Callaghan | |
| 2006/0041708 A1 | 2/2006 | Kunemund | |
| 2006/0098814 A1 | 5/2006 | Al-Khoraidly et al. | |
| 2006/0136751 A1 | 6/2006 | Bonaccio et al. | |
| 2006/0192681 A1 | 8/2006 | Haider et al. | |
| 2007/0075251 A1 | 4/2007 | Doughty et al. | |
| 2008/0059741 A1 | 3/2008 | Croguennec et al. | |
| 2008/0061843 A1 | 3/2008 | Yanci | |

FOREIGN PATENT DOCUMENTS

| | | |
|---|---|---|
| EP | 1 014 617 | 6/2000 |
| EP | 1 098 471 | 5/2001 |
| EP | 1 107 502 | 6/2001 |
| EP | 1 217 783 | 6/2002 |
| EP | 1 496 641 | 1/2005 |
| EP | 1 601 132 | 11/2005 |
| WO | WO 00/67410 | 11/2000 |
| WO | WO 01/55821 | 8/2001 |
| WO | WO 01/61914 | 8/2001 |
| WO | WO 01/61915 | 8/2001 |
| WO | WO 01/61916 | 8/2001 |
| WO | WO 2004/112306 | 12/2004 |
| WO | WO 2007/020457 | 2/2007 |
| WO | WO 2007/020567 | 2/2007 |

OTHER PUBLICATIONS

International Search Report & Written Opinion, PCT/US2007/077112, mailed Apr. 25, 2008, 16 pages.

International Search Report & Written Opinion, PCT/US2007/060628, mailed May 5, 2008, 13 pages.

Computer Laboratory, University of Cambridge "Improving Smart Card Security Using Self-Timed Circuits" http://doi.ieeecomputersociety.org/10.1109/ASYNC.2002.1000311, 2002, 8 pages.

School of EECE, University of Newcastle Upon Tyne "Power-Balanced Self Checking Circuits for Cryptographic Chips", http://doi.ieeecomputersociety.org/10.1109/IOLTS.2005.56, 2005, 6 pages.

Department of Electrical and Computer Engineering, Boston University "Robust Protection against Fault-Injection Attacks on Smart Cards Implementing the Advanced Encryption Standard" http://doi.ieeecomputersociety.org/10.1109/DSN.2004.1311880, 2004, 9 pages.

Mehdi-Laurent Akkar "Automatic Integration of Counter-Measures Against Fault Injection Attacks" http://www.labri.fr/perso/ly/publications/cfed.pdf, 2003, 13 pages.

Li, Huiyun, "Security evaluation at design time for cryptographic hardware," Technical Report No. 665, University of Cambridge Computer Laboratory, Document UCAM-CL-TR-665/ISSN 1476-2986, Apr. 2006, 79 pages.

Kommerling and Kuhn, "Design Principles for Tamper-Resistant Smartcard Processors" *USENIX* Workshop on Smartcard Technology, Chicago, Illinois USA, May 10-11, 1999, 13 pages.

Bar-El, et al. "The Sorcerer's Apprentice Guide to Fault Attacks" IEEE Xplore, Feb. 2006, vol. 94, Issue 2, pp. 370-382, 13 pages.

"G3 Card IST-1999-13515 Public Final Report" Jan. 2003, 33 pages.

Naccache, "Finding Faults," CryptoCorner—IEEE Security & Privacy, IEEE Computer Society, Sep./Oct. 2005, pp. 61-65, 5 pages.

Neve, et al., "Memories: a Survey of their Secure Uses in Smart Cards," *Proceedings of the $2^{nd}$ IEEE International Security in Storage Workshop*, 2004, 11 pages.

Philips "P5CC036 Secure PKI Smart Card Controller—Short Form Specification" Mar. 26, 2004, 9 pages.

Rankl, "Overview about Attacks on Smart Cards" $3^{rd}$ Edition of *Smart Card Handbook* Sep. 2003, 16 pages.

Ravi et al. "Tamper Resistance Mechanisms for Secure Embedded Systems" *Proceedings of the $17^{th}$ International Conference on VLSI Design (VLSID '04)* IEEE Computer Society, 2004, 7 pages.

Skorobogatov and Anderson, "Optical Fault Induction Attacks" University of Cambridge, Computer Laboratory, Springer-Verlag Berlin Heidelberg 2003, pp. 2-12, 11 pages.

TNO ITSEF BV Functionally Testing of Smart Cards http://www.itsef.com/level3/ftsc.htm, 2006, 2 pages.

* cited by examiner

VERIFYING DATA INTEGRITY IN A DATA STORAGE DEVICE

CROSS-REFERENCE TO RELATED APPLICATIONS

This application claims the benefit of prior U.S. provisional application 60/834,609, filed Jul. 31, 2006.

TECHNICAL FIELD

The disclosed implementations relate to electrical circuits.

BACKGROUND

Storage devices may be employed in various secure applications to store protected data. For example, a semiconductor memory circuit may be used in a smartcard, set-top box, Subscriber Identity Module (SIM) card or banking card to store user identification information, account information, device preference information or electronic payment authorization information.

Because of the potential value of protected data stored in a storage device, hackers may employ various techniques to access or corrupt the protected data. For example, a hacker may grind off a portion of the storage device packaging in order to access internal signals and bypass security measures that may be in place. As another example, a hacker may subject the storage device to various kinds of radiation (e.g., laser light directed to exposed internal circuits or x-ray or gamma radiation directed through packaging) in an attempt to corrupt protected data. In some devices, corruption of protected data at certain locations in the device may cause the device to bypass security measures (e.g., encryption algorithms) or to yield information to the hacker regarding device architecture or the protected data itself.

SUMMARY

In some implementations, a data storage device stores predetermined values of "verification data" for use in detecting a possible attempt by a hacker to access or corrupt protected "application data" that is also stored in the data storage device. Each time application data is retrieved from an application memory cell in the data storage device, verification data is also retrieved from a corresponding verification memory cell. An expected value of the retrieved verification data is determined. If the actual retrieved value matches the expected value, the application data is presumed to be uncorrupted and is provided to a requesting device; if the actual retrieved value of the verification data does not match the expected value, the verification data may have been corrupted by an unauthorized attempt to access or corrupt data stored in the device, and a protective measure is initiated.

In some implementations, a data storage device includes one or more pages, each page having a fixed number of memory cells, each memory cell being adapted to store one unit of data; a verification page, the verification page having a corresponding fixed number of verification cells, each verification cell storing a predetermined value; and a controller configured to 1) receive a read command having an address value, and 2) upon receiving the read command, a) retrieve a predetermined value from a verification cell corresponding to the address value, b) determine whether the retrieved predetermined value is an expected value, and c) if so, providing a retrieved unit of data, and if not, initiating a protective action.

In some implementations, the data storage device further includes an interface configured to a) receive data to be stored in one of the plurality of memory cells and b) provide data retrieved from one of the plurality of memory cells. The controller may be further configured to retrieve the unit of data from a memory cell corresponding to the address value. The data storage device may further include a common data channel, where both data retrieved from the one or more pages and data retrieved from the verification page are retrieved through the common data channel. The data storage device may further include a pseudo-random or random order unit that pseudo-randomly or randomly selects whether to a) first retrieve the stored unit of data from the memory cell and subsequently retrieve the predetermined value from the verification cell or b) first retrieve the predetermined value from the verification cell and subsequently retrieve the stored unit of data from the memory cell. The data storage device may further include a bypass selector that is configured to cause the controller to retrieve the stored unit of data from the memory cell and provide the retrieved unit of data without retrieving the predetermined value.

Determining whether the retrieved predetermined value is the expected value may include applying a function to the address value to obtain a result and determining whether the result corresponds to the retrieved predetermined value. Determining whether the result corresponds to the retrieved predetermined value may include determining whether the predetermined value is equal to at least a portion of the address value. Initiating a protective action may include at least one of powering down a portion of a device comprising the one or more pages and the verification page, resetting a portion of the device comprising the one or more pages and the verification page, preventing a new value from being stored in any of the one or more pages, or irreversibly altering a portion of the data storage device.

In some implementations, a method of retrieving data from a device includes receiving an address for a memory location in the device; retrieving a predetermined value from a verification cell in the device associated with the memory location; determining whether the retrieved predetermined value is an expected value; and if the retrieved predetermined value is the expected value, providing a retrieved unit of data; and if the retrieved predetermined value is not the expected value, initiating a protective action.

The method may further include retrieving the unit of data from the memory location. Retrieving the predetermined value may include retrieving the predetermined value through a common data channel; retrieving the unit of data may also include retrieving the unit of data through the common data channel. In some implementations, determining whether the retrieved predetermined value is the expected value includes applying a first function to the address to obtain a first result, applying a second function to the predetermined value to obtain a second result, and determining whether the first result corresponds to the second result. In some implementations, determining whether the retrieved predetermined value is the expected value includes determining whether at least a portion of the retrieved predetermined value is equal to a corresponding portion of the received address.

In some implementations, retrieving data from a device includes receiving an address corresponding to a memory location in a device; determining whether the device is in a secure mode or a bypass mode; if the device is in the secure mode, a) retrieving a predetermined value from a verification cell; b) determining whether the retrieved predetermined value is an expected value; and c) if the retrieved predetermined value is the expected value, providing a retrieved unit of data; and if the retrieved predetermined value is not the expected value, initiating a protective action; and if the device is in the bypass mode, providing a retrieved unit of data.

The verification cell may correspond to the memory location. Retrieving the unit of data from the memory location may include decoding the address into at least a row address and a column address, and retrieving the unit of data from a specific memory cell in a matrix of memory cells, the specific cell having the row address and the column address. Retrieving the predetermined value may include retrieving a value from a verification cell in the matrix of memory cells, the verification cell having at least one of the row address or the column address. In some implementations, determining whether the device is in a secure mode or a bypass mode includes determining whether a register is storing a first value or a second value. In some implementations, determining whether the device is in a secure mode or a bypass mode includes determining whether a fuse is intact or blown.

The disclosed implementations may be implemented using a system, a method or a computer program, or any combination of systems, methods and computer programs. The details of one or more implementations are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
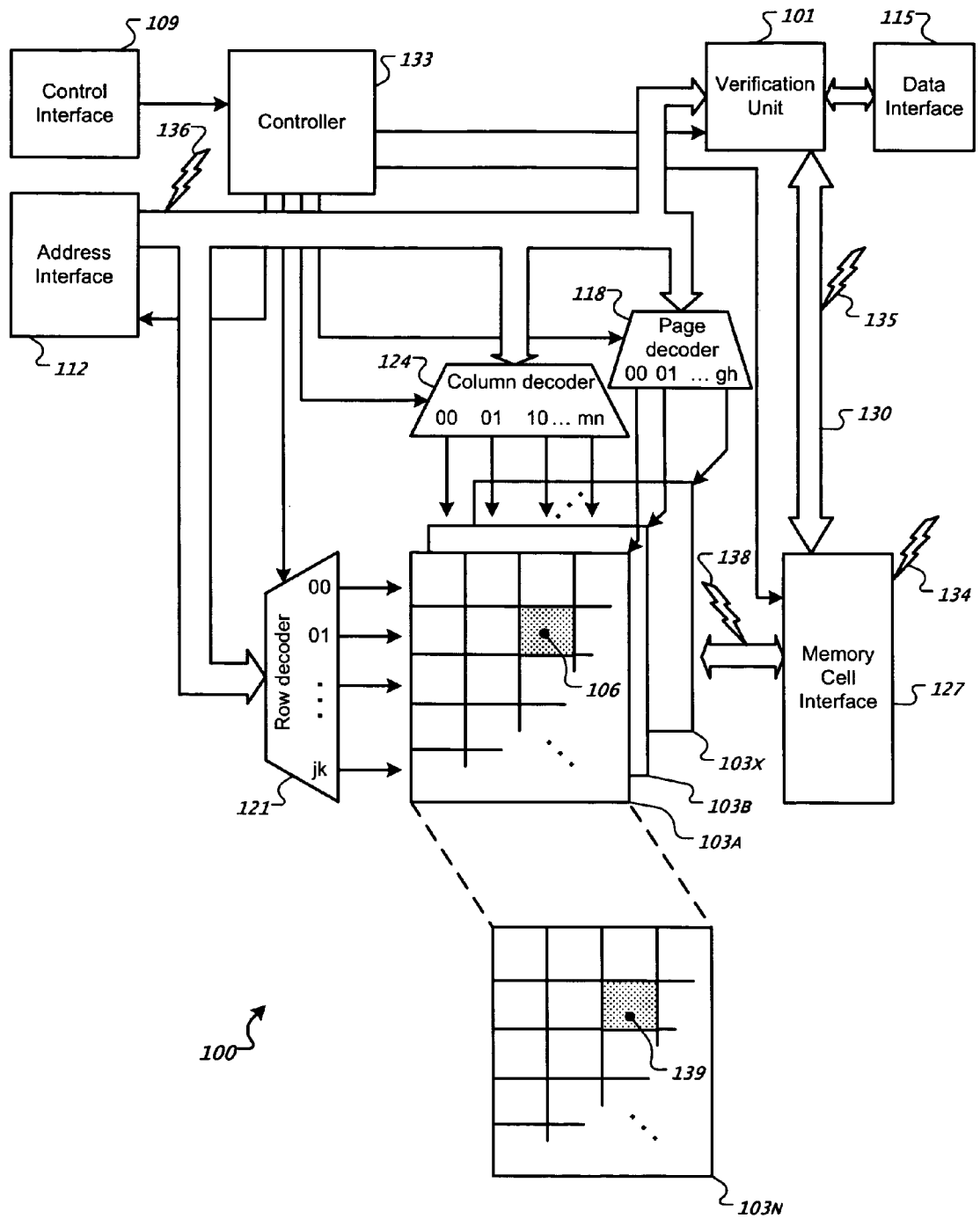
FIG. 1 is a block diagram of a data storage device that includes a verification unit for detecting unauthorized attempts to corrupt or access protected data.

FIG. 1 is a block diagram of a data storage device 100 (e.g., a memory device) that includes a verification unit 101 that can detect unauthorized attempts to corrupt or access protected data in the memory device 100. The memory device 100 is generally configured to store data provided by an external circuit (e.g., in response to a write command; external circuit not shown) or provide data in response to an authorized request by the external circuit (e.g., in response to a read command). Because the data stored in or retrieved from the memory device 100 may be protected data used in a sensitive application (e.g., an application involving user identification information, financial or other account information, or payment authorization information) a hacker may attempt to corrupt or access the protected data. As described in more detail below, the verification unit 101 can detect some attempts to corrupt or access the data, and initiate a protective measure in response.

In some implementations, data is stored in the exemplary memory device 100 in a number of "pages" 103A-103X, and each page is arranged as a matrix of memory locations or "cells," where each memory cell stores a unit of data having a fixed size (e.g., one byte, one word, etc.) As shown in FIG. 1, individual memory cells within a page are addressable by a row address and a column address, and pages are addressable by a page address. For example, memory cell 106 is addressable with a page address of "00," a row address of "01" and a column address of "10." The memory pages 103A-103X shown in FIG. 1 are merely exemplary; an actual memory device may have more or fewer pages, rows or columns; or an actual memory device may have a non-paged architecture.

To store data in the memory device 100 or to retrieve data from the memory device 100, an external circuit (not shown) supplies an address and one or more control signals specifying whether data is to be stored in or retrieved from the memory device 100, or whether some other action is to be performed (e.g., memory is to be "refreshed" or erased or configured). Certain combinations of signals can be defined as "commands" to initiate particular operations (e.g., a read command, write command, refresh command, etc.) The external circuit interfaces with the memory device 100 through a control interface 109, an address interface 112 and a data interface 115. The external circuit can supply appropriate signals to the control interface 109 to specify, for example, a write command or a read command; the external circuit can supply an address to the address interface; and, in the case of a write operation, the external circuit can supply data to be written at the data interface 115.

The memory device 100 may employ additional circuits to store or retrieve data in response to signals provided by the external circuit to the control interface 109, address interface 112 and data interface 115. For example, as shown, the memory device 100 includes a page decoder 118, row decoder 121 and column decoder 124. The decoders 118, 121 and 124 can decode a single address value received by the address interface 112 into page, row and column addresses that identifies a specific memory cell. In some implementations, the page decoder 118, row decoder 121 and column decoder 124 simply split off particular bits of the received address value to obtain page, row and column addresses. For example, an address value of "000110" can be decoded as identifying the memory cell 106 having a page address of "00," a row address of "01" and a column address of "10." In other implementations, received address values are decoded in some other manner to create page, row and column addresses.

To store data in or retrieve data from a specific memory cell having a decoded page address, row address and column address, the memory device 100 employs a memory cell interface 127. In some implementations, the memory cell interface 127 includes sense amplifiers (not shown) that boost signal values associated with data that is to be retrieved from a memory cell; the memory cell interface 127 may include other input/output gating circuitry (not shown) and write circuitry (not shown) for storing data in a memory cell. In general, the memory cell interface 127 has access to each memory cell in the memory device 100; thus, in some implementations, the memory device 100 can include a large number of connections between the memory cell interface 127 and individual memory cells. In some implementations, a smaller number of connections couples the memory cell interface 127 to the data interface 115. For example, as shown in FIG. 1, a common data channel 130 couples the memory cell interface 127 to the data interface 115, through the verification unit 101. Thus, in some implementations, all data being stored in the memory cells or retrieved from the memory cells is conveyed from or to the data interface 115 by the common data channel 130. Circuitry within the memory interface can multiplex or demultiplex data, as appropriate, between the large number of connections between the memory cell interface 127 and the memory cells, and the smaller number of connections between the memory cell interface 127 and the common data channel 130.

The memory device 100 also includes a controller 133 to manage overall operation of the memory device 100. In response to control signals received by the control interface 109, the controller 133 can cause the page decoder 118, row decoder 121 and column decoder 124 to appropriately decode an address value received by the address interface 112; and route data to or from the data interface 115 through the verification unit 101, common data channel 130 and memory cell interface 127. The controller 133 can also control various aspects of the verification unit 101, as will be described in greater detail below.

One or more of the memory pages 103A-103X can be configured as a verification page 103N that stores predetermined values in each of its "verification cells," in some implementations. As shown, the verification page 103N (referred to in this document in the singular, although the memory device 100 may include multiple verification pages) is configured to have the same organization as the other pages (e.g., row, column organization), but the verification page 103N is not directly accessible by circuits external to the memory device 100; rather, in some implementations, the verification page 103N is only accessible to the verification unit 101. To distinguish the verification page 103N or pages from non-verification pages 103A-103X, the non-verification pages are referred to as "application pages" in this document, and the data stored in or retrieved from the application pages is referred to as "application data." Note that "application data" can include any kind of data stored in the memory device 100 (e.g., actual data for an application, program instructions, configuration data for a device, etc.)

The values stored in the verification page 103N can be "predetermined" in the sense that they can be hard-coded or configured to be independently verified or authenticated when the values are retrieved. For example, in some implementations, the address (or a portion or permutation thereof) of a verification cell is stored as that cell's content. In this manner, the integrity of the verification cell and of a read path by which the verification cell data is retrieved can be verified as "uncorrupted." (Data corruption is discussed in more detail below.) For example, if a verification cell 139 having an address "000110" stores as its value, "00000110" (e.g., a zero-padded version of the address), and the content of this verification cell is read as "00101110," the verification unit 101 can detect that the verification data has been corrupted. Detection of data corruption can provide an indication that a hacker has compromised the memory device 100, and the verification unit 101 can initiate a protective measure in response, in order to secure protected data stored in the memory device 100.

Periodically, the verification unit 101 can retrieve data from the verification page 103N and determine if the retrieved data has an expected value. In particular, the controller 133 can cause the verification unit 101 to provide an address value that is subsequently decoded by the page decoder 118, row decoder 121 and column decoder 124 to identify a specific verification cell (e.g., verification cell 139) that stores a predetermined data value. The controller 133 can further cause the predetermined data value to be retrieved through the memory cell interface 127 and common data channel 130, and to be provided to the verification unit 101. The verification unit 101 can then determine an expected value of the retrieved data (the predetermined value), and compare the actual value of the retrieved data to the expected value. If the actual value of the retrieved data is different than the expected value, then the data may have been corrupted (e.g., by a hacker) as it was retrieved (or otherwise corrupted)—in particular, in some implementations, as the data was retrieved by the memory cell interface 127 and conveyed to the verification unit 101. Accordingly, the controller 133 can initiate a protective measure, as described in more detail below, if the actual retrieved value and expected value are different.

In some implementations, data is particularly sensitive to corruption (e.g., corruption by laser light or other radiation) as it passes to, through or from the memory cell interface 127 or the common data channel 130; in some implementations, address values are also sensitive to corruption. This sensitivity is graphically depicted by lightning bolt symbols 134, 135 and 136 and 138. In part, this sensitivity to data corruption or address value corruption can be related to physical architecture of the memory device 100. That is, because, in some implementations, the memory cell interface 127 couples substantially all of the memory cells to a small number of circuit traces associated with the common data channel 130, the small number of circuit traces is routed over a large area of the memory device 100 and is easily identifiable as such by a hacker who has removed packaging from the memory device or who has otherwise analyzed physical structure of the memory device (e.g., via x-ray inspection). Because they are easily identified in some implementations, the common data channel 130 signals and memory cell interface 127 circuitry provide easy targets to which hackers can direct radiation (e.g., laser light or x-ray or gamma radiation). Similarly, address lines can be routed over a large area of the memory device 100 and can also be easily identified, providing additional targets to which hackers can direct radiation. Such radiation can have the effect of altering individual data or address bits. As mentioned above, by way of background, alteration or corruption of certain data or address bits can cause the memory device 100 to bypass security measures (e.g., an encryption algorithm) or to yield information that may be useful to a hacker regarding device architecture or protected data stored in the memory device 100. Accordingly, detection of possible radiation attacks can enable the controller 133 to initiate protective measures to increase the security of the memory device 100. In some implementations, other portions of the memory device 100 are also sensitive to data corruption by radiation.

In some implementations, protective measures include powering down the memory device 100, resetting the memory device 100, erasing data stored in the memory device 100, preventing new data from being written to the memory device 100, or irreversibly altering portions of the memory device 100. For example, to protect data inside a device that has been physically altered by a hacker, a protective circuit can cause portions of the memory cell interface to self-destruct (e.g., the controller 133 can subject certain traces to short voltages or currents that cause the traces to melt, irreversibly preventing the device from providing stored data to external circuitry).

Various protective measures are initiated in a progressive manner, in some implementations. For example, the verification unit 101 can include a counter (not shown in FIG. 1) that is incremented each time an actual retrieved verification value differs from an expected value. Initially, detection of a different-than-expected verification value can cause the controller 133 to initiate a reset of the memory device 100 (e.g., a current read or write operation can be ignored, and the memory device 100 can be transitioned to an initial power-on state); after the counter reaches a first threshold, the controller 133 can power down the memory device each time a different-than-expected verification value is detected; after the counter reaches a second threshold, the controller 133 can cause a circuit or trace to be irreversibly altered.

In some implementations, verification data is retrieved from the verification page 103N each time application data is retrieved from one of the application pages 103A-103X. That is, application data is retrieved in response to a read command received at the control interface 109 and an address value received that the address interface 112. In this example, the application data is retrieved from the application memory cell 106. Once retrieved from the memory cell 106 (e.g., through the memory cell interface 127 and the common data channel 130) the data is temporarily buffered in the verification unit 101. Verification data from a corresponding verification cell 139 is also retrieved. For example, the controller 133 or the verification unit 101 can cause data to be retrieved from the verification cell 139 (e.g., using the memory cell interface 127 and common data channel 130), and this data is also buffered in the verification unit 101. Once the verification data is buffered in the verification unit 101, its value is compared to an expected value. If the values match, the buffered application data is released to the data interface 115; if the values do not match, the controller 133 or verification unit 101 initiates a protective measure. In some implementations, the order in which application data and verification data is retrieved is varied (e.g., randomly or pseudo-randomly). Varying the retrieval order may provide an additional level of security to protect against hackers who are aware of the verification data and verification protocol.

As mentioned above, the verification page 103N has the same organization (e.g., row, column organization) as the application pages, in some implementations. In these implementations, a verification cell, such as the verification cell 139, "corresponds to" a memory cell, such as the memory cell 106, if the verification cell has the same row and column address as the application cell. Thus, to retrieve data from a "corresponding" verification cell when data is retrieved from an application cell, the verification unit 101 supplies the same row and column addresses as those row and column addresses used to retrieve the application data. In this manner, only a new page address is be required to retrieve the verification data. To supply the row and column addresses for two different data retrieval operations, the verification unit 101 can latch the address value received from the address interface, the controller 133 can cause the address interface 112 to latch address value, or the controller 133 can cause the row decoder and column decoder to latch the decoded address values.

Figure 2:
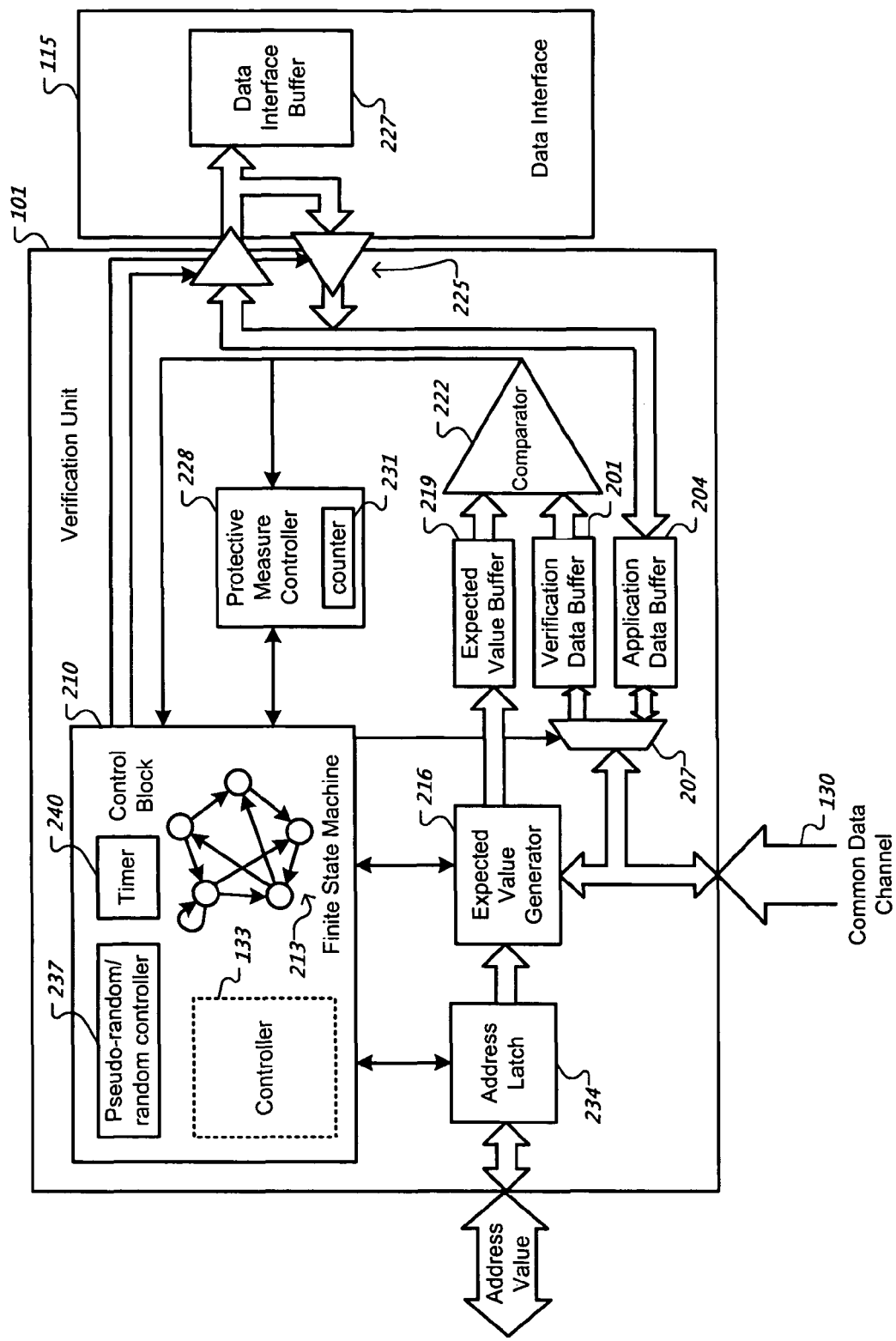
FIG. 2 is a block diagram providing additional details of an exemplary verification unit.

Additional details of the exemplary verification unit 101 are now provided with reference to FIG. 2. The verification unit 101 buffers data retrieved through the common data channel 130 in either a verification data buffer 201 or an application data buffer 204. The target buffer 201 or 204 is selected by a data selector 207 (e.g., a multiplexer) under the control of a control block 210, based on whether the retrieved data is application data or verification data. As shown, the control block 210 includes a finite state machine 213 to control the overall operation of the verification unit 101. The control block 210 can include the controller 133, as shown; or the control block 210 can be integrated in the controller 133, which may provide overall control of the memory device 100, including the verification unit 101. In some implementations, control is provided by means other than the finite state machine 213, controller 133 or control block 210 that are shown in FIG. 2; for example, control can be provided by a microcontroller or microprocessor executing microcode or programming code.

As shown, the verification unit 101 employs an expected value generator 216 to determine or generate an expected value for retrieved verification data. The verification unit also employs an expected value buffer 219 to temporarily store the determined or generated expected value, and a comparator 222 to compare values stored in the verification data buffer 201 and the expected value buffer 219.

If the comparator 222 determines that the value stored in the verification data buffer 201 matches the value stored in the expected value buffer 219, the control block 210 causes data buffered in the application data buffer 204 to be released to the data interface 115 (e.g., via a bi-directional buffer or gate 225 to a data interface buffer 227 in the data interface 115, which can be coupled to external pins or output lines of the memory device 100). If the comparator 222 determines that the value stored in the verification data buffer 201 does not match the value stored in the expected value buffer 219, the control block 210 can cause a protective measure controller 228 to initiate a protective measure. As described above, the specific protective measure initiated can depend on a number of times a difference between a verification data value and an expected value has been detected. As such, the protective measure controller 228 includes a counter 231 to track this number.

The expected value of the verification data is related to the address of the verification cell from which the verification data was retrieved, in some implementations. For example, the expected value (predetermined value) can be the row and/or column address of the corresponding verification cell, or a portion of the row and/or column address. As another example, the expected value (predetermined value) can be a portion of the address value, modified in some way (e.g., via a predetermined permutation function). Because the expected value is related to the address value in some implementations, the verification unit 101 buffers the address value with an address latch 234, and the expected value generator 216 receives the buffered address value from the address latch 234 for use in generating the expected value. As described above, the address latch 234 can also latch values to support subsequent retrievals of application data and verification data.

The control block 210 can employ a pseudo-random/random controller 237 in conjunction with the finite state machine 213 to selectively alter the order in which application data and verification data is retrieved. As described above, such an alteration in the order in which application data and verification data is retrieved may provide an added level of security for the memory device 100.

To facilitate storage of data in the memory device 100, the bi-directional buffer 225 conveys "write data" to the application data buffer 204, as shown, and the control block 210 can cause this data to be routed to the common data channel 130 through the data selector 207. In some implementations, write data received at the data interface 115 can be directly routed to the common data channel 130 (via a path not shown).

Although the memory device 100 has been described above as retrieving verification data each time application data is retrieved, verification data may be retrieved less frequently; in some implementations, application data may be directly provided to the data interface 115, without being buffered in the verification unit 101 while corresponding verification data is compared to an expected value. For example, in some implementations, verification data may be periodically retrieved and compared to an expected value—independently of read accesses—for example, based on time intervals marked by a timer 240.

In some implementations, the verification unit 101 can be disabled based, for example, on input to the control block 210. For example, in some implementations, memory device 100 has a "secure mode," in which verification data is retrieved and checked each time application data is retrieved; and a "bypass mode," in which application data is retrieved and immediately provided to the data interface 115. The secure mode may provide more security for protected data, while the bypass mode may provide better retrieval performance for non-protected data. In some implementations, the mode is determined when the memory device 100 is manufactured. For example, the mode can be determined by an internal signal that has a logical value that is dependent on the state of a fuse that is be either intact or blown; the fuse can be left intact or blown during a manufacturing process to configure a particular memory device 100 to operate in either a secure or bypass mode. In other implementations, the mode is user-configurable, for example through register settings that can be adjusted through signals input to the control interface 109. A method of retrieving data in either a secure mode or a bypass mode is further described with reference to FIG. 3.

Figure 3:
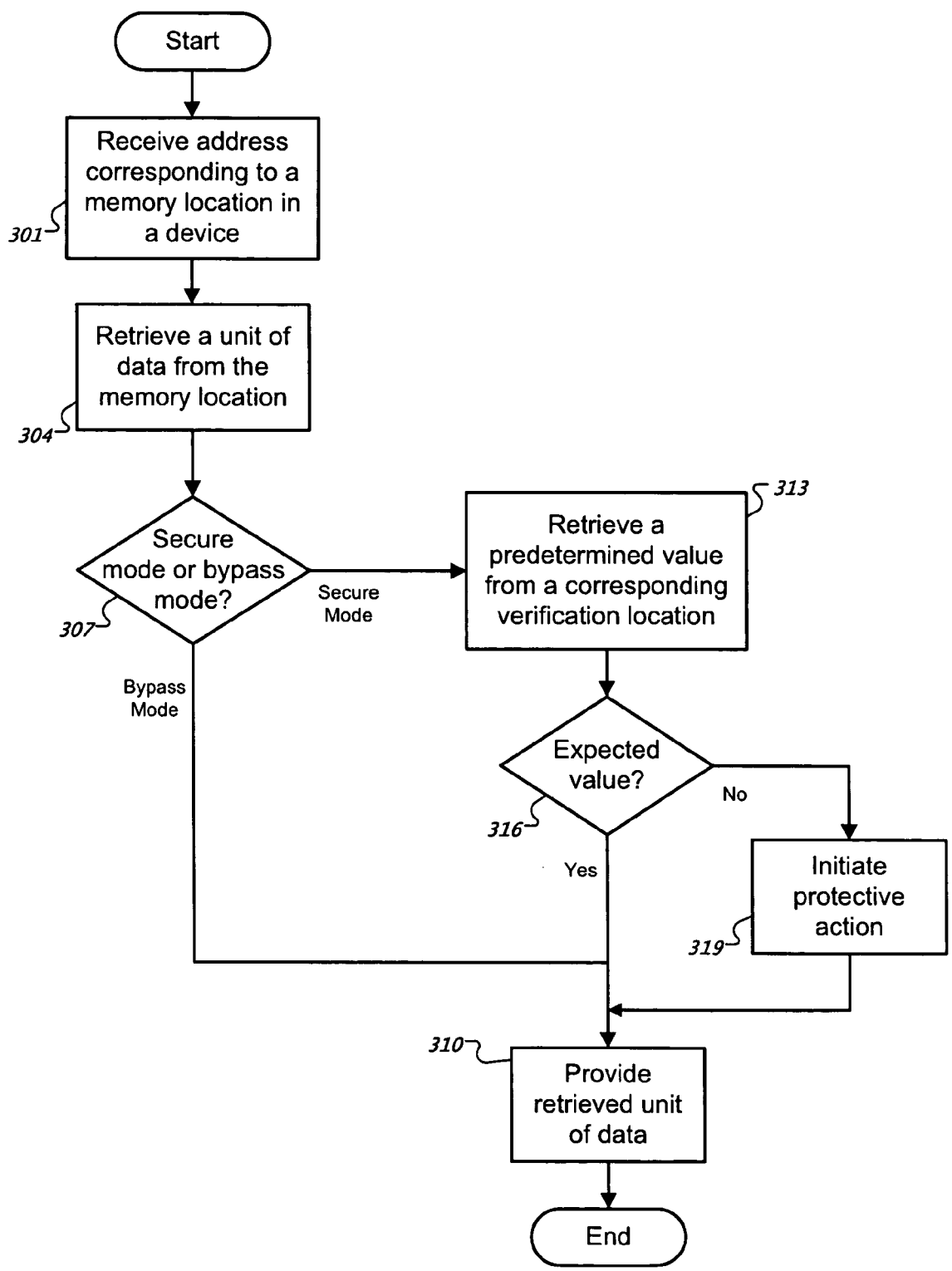
FIG. 3 is a flow diagram illustrating an example method for retrieving data from a memory device.

FIG. 3 illustrates a method 300 of retrieving data from a memory device, according to some implementations. As shown, the method 300 includes receiving (301) an address corresponding to a memory location in a device. For example, referring to FIG. 1, the memory device 100 receives at the address interface 112 an address value corresponding to a specific application memory cell, for example, cell 106. In conjunction with this address value, the memory device 100 also receives signals at the control interface 109 that specify a retrieval or "read" operation.

The method 300 includes retrieving (304) a unit of data from the memory location corresponding the received (301) address value. For example, the memory device 100 can decode the received (301) address value using the page decoder 118, row decoder 121 and column decoder 124 to identify a specific memory cell (e.g., memory cell 106), and the controller 133 can cause the data stored in the identified specific memory cell to be retrieved (304) via the memory cell interface 127 and common data channel 130, and buffered in the application data buffer 204 that is shown in FIG. 2.

The method 300 includes determining (307) whether the memory device is in a secure mode or a bypass mode. For example, the control block 210 can determine (307) the mode based on input received at the control interface 109 or based on an internal signal or register value.

If the memory device is determined (307) to be in a bypass mode, the retrieved unit of data can be provided (310). For example, the control block 210 can cause data buffered in the application data buffer 204 to be released to the data interface buffer 227. In some implementations, the mode can be determined (307) before the application data is retrieved (304); and if the memory device 100 is in bypass mode, the retrieved (304) application data can be provided directly to the data interface buffer 227, without being intermediately stored in the application data buffer 204.

If the memory device 100 is determined (307) to be in a secure mode, a predetermined value can be retrieved (313) from a corresponding verification location. For example, the verification unit 101 can retrieve (313), under the control of the control block 210 data from a verification cell (e.g., verification cell 139) that corresponds to the memory cell from which the application data was retrieved (e.g., memory cell 106). In particular, the verification data can be retrieved (313) from a verification cell having the same row address and column address as the corresponding application data cell. To perform this second retrieval, the verification unit 101 can latch at least a portion of the address value received (301) from the address interface 112 (e.g., the portion corresponding to the row and column address) and provide a new page address that identifies the appropriate verification page (e.g., verification page 103N).

The method 300 includes determining (316) whether the retrieved (313) predetermined value matches an expected value. For example, the verification unit 101 can employ the expected value generator 216 to generate an expected value and store this value in the expected value buffer 219. The verification unit 101 can then compare the value stored in the expected value buffer 219 with the value stored in the verification data buffer 201 using the comparator 222, and determine (316) if the two values match. As described above, the expected value generator 216 can, in some implementations, generate the expected value based on at least a portion of an address value, which can be latched by address latch 234.

If the retrieved (313) predetermined value matches the expected value, the retrieved (304) unit of data can be provided (310). For example, the control block 210 can release the value stored in the application data buffer 204 to the data interface 115 (e.g., to a data interface buffer 227 in the data interface 115).

If the retrieved (313) predetermined value does not match the expected value, protective action can be initiated (319). For example, the control block 210, based on input received from the comparator 222 that values in the expected value buffer 219 and verification data buffer 201 do not match, can cause the protective measure controller 228 to initiate a protective measure. As described above, the specific protective measure initiated (319) can depend on a number of times a difference between a retrieved verification value and expected value is detected; this number can be tracked by the counter 231. Example protective measures can include resetting the memory device 100, powering down the memory device 100, erasing data stored in the memory device 100, or irreversibly altering a portion of the memory device 100.

A number of implementations have been described. Nevertheless, it will be understood that various modifications may be made without departing from the spirit and scope of the disclosed implementations. For example, the above-described methods, systems and techniques may be applied to non-paged data storage devices having memory locations and corresponding verification locations. As another example, actions performed by the above-described methods may be reordered, and some actions may be omitted. As another example, verification cells may store predetermined values that are not related to address values but that can be subsequently independently generated to authenticate verification data. Accordingly, other implementations are within the scope of the following claims:

What is claimed is:

1. An apparatus comprising a data storage device including:
    a working memory area having a fixed number of working cells accessible at respective addresses, each memory cell being adapted to store one unit of data;
    a verification memory area having a corresponding fixed number of verification cells accessible at the same addresses as the working cells, each verification cell storing a predetermined value equal to a function of the address of the verification cell; and
    a controller configured to 1) receive a read command having an address value, and 2) upon receiving the read command, a) retrieve the value stored in the verification cell selected by the address value, b) determine whether the retrieved value is equal to said function of the address value, and c) if so, retrieve the unit of data stored in the working cell selected by the address value, and if not, initiate a protective action.

2. The data storage device of claim 1, further comprising an interface configured to a) receive data to be stored in one of the plurality of memory cells and b) provide data retrieved from one of the plurality of memory cells.

3. The data storage device of claim 1, further comprising a common data channel, wherein both data retrieved from the working cell and data retrieved from the verification cell are retrieved through the common data channel.

4. The data storage device of claim 1, further comprising a pseudo-random/random order unit, the pseudo-random/random order unit pseudo-randomly or randomly selecting whether to a) first retrieve the stored unit of data from the working cell and subsequently retrieve the predetermined value from the verification cell or b) first retrieve the predetermined value from the verification cell and subsequently retrieve the stored unit of data from the working cell.

5. The data storage device of claim 1, wherein said function is configured to return at least a portion of the address value.

6. The data storage device of claim 1, further comprising a bypass selector, the bypass selector configured to cause the controller to retrieve the stored unit of data from the working cell and provide the retrieved unit of data without retrieving the predetermined value.

7. The data storage device of claim 1, wherein initiating a protective action comprises at least one of powering down a portion of the data storage device, resetting a portion of the data storage device, preventing a new value from being stored in any of the memory cells, or irreversibly altering a portion of the data storage device.

8. A method of retrieving data from a device comprising:
receiving an address for a memory location in the device;
retrieving a value from a verification cell in the device associated with the memory location, the verification cell storing a predetermined value equal to a function of the address of the memory location;
determining whether the retrieved value is an expected value equal to said function of the received address; and
if the retrieved value is the expected value, providing a data value as a retrieved unit of data; and if the retrieved value is not the expected value, initiating a protective action.

9. The method of claim 8, further comprising retrieving the unit of data from the memory location.

10. The method of claim 8, wherein retrieving the value from the verification cell comprises retrieving the value through a common data channel.

11. The method of claim 10, wherein retrieving the unit of data comprises retrieving the unit of data through the common data channel.

12. The method of claim 8, wherein said function returns at least a portion of the received address.

13. A method of retrieving data from a device comprising:
receiving an address corresponding to a memory location in a device;
determining whether the device is in a secure mode or a bypass mode;
if the device is in the secure mode, a) retrieving a value from a verification cell storing a predetermined value equal to a function of an address value associated with the verification cell; b) determining whether the retrieved value is an expected value equal to said function of the received address; and c) if the retrieved value is the expected value, providing a data value as a retrieved unit of data; and if the retrieved value is not the expected value, initiating a protective action; and
if the device is in the bypass mode, providing a retrieved unit of data.

14. The method of claim 13, further comprising retrieving the unit of data from the memory location.

15. The method of claim 13, wherein the verification cell corresponds to the memory location.

16. The method of claim 13, wherein retrieving the unit of data from the memory location comprises decoding the address into at least a row address and a column address, and retrieving the unit of data from a specific memory cell in a matrix of memory cells, the specific cell having the row address and the column address.

17. The method of claim 16, wherein retrieving the value comprises retrieving a value from a verification cell in the matrix of memory cells, the verification cell having at least one of the row address or the column address.

18. The method of claim 13, wherein determining whether the device is in a secure mode or a bypass mode comprises determining whether a register is storing a first value or a second value.

19. The method of claim 13, wherein determining whether the device is in a secure mode or a bypass mode comprises determining whether a fuse is intact or blown.

20. The method of claim 13, wherein initiating the protective action comprises powering down at least a portion of the device.

21. The method of claim 13, wherein initiating the protective action comprises irreversibly altering a circuit in the device.

22. An article of manufacture comprising a non-transitory storage media containing instructions that, when executed by a controller, perform operations comprising:
receiving an address corresponding to a memory location in a device;
determining whether the device is in a secure mode or a bypass mode;
if the device is in the secure mode, a) retrieving a value from a memory verification cell corresponding to the memory location, the verification cell storing a predetermined value equal to a function of an address value associated with the verification cell; b) determining whether the retrieved value is an expected value equal to said function of the received address; and c) if the retrieved value is the expected value, providing a data value as a retrieved unit of data, and if the retrieved value is not the expected value, initiating a protective action; and
if the device is in the bypass mode, outputting a retrieved unit of data.

23. The article of manufacture of claim 22, wherein the operations further comprise retrieving the unit of data from the memory location.

* * * * *